(12) United States Patent
Shinozaki et al.

(10) Patent No.: US 6,539,043 B1
(45) Date of Patent: Mar. 25, 2003

(54) DISCHARGE-PUMPED EXCIMER LASER DEVICE

(75) Inventors: Hiroyuki Shinozaki, Kanagawa (JP); Shinichi Sekiguchi, Kanagawa (JP); Toshimitsu Barada, Tokyo (JP); Toshiharu Nakazawa, Kanagawa (JP)

(73) Assignees: Ebara Corporation, Tokyo (JP); Komatsu, Ltd., Tokyo (JP)

( * ) Notice: Subject to any disclaimer, the term of this patent is extended or adjusted under 35 U.S.C. 154(b) by 0 days.

(21) Appl. No.: 09/856,138

(22) PCT Filed: Nov. 26, 1999

(86) PCT No.: PCT/JP99/06601

§ 371 (c)(1), (2), (4) Date: May 29, 2001

(87) PCT Pub. No.: WO00/33431

PCT Pub. Date: Jun. 8, 2000

(30) Foreign Application Priority Data

Nov. 30, 1998 (JP) ............................................. 10-340577

(51) Int. Cl.⁷ .............................................. H01S 3/22
(52) U.S. Cl. .............................. 372/59; 372/57; 372/58
(58) Field of Search ................................ 372/57, 58, 59

(56) References Cited

U.S. PATENT DOCUMENTS

| | | | |
|---|---|---|---|
| 3,650,581 A | | 3/1972 | Boden et al. |
| 4,500,142 A | | 2/1985 | Brunet |
| 4,534,034 A | * | 8/1985 | Hohla et al. ................... 372/59 |
| 4,959,840 A | * | 9/1990 | Akins et al. ................... 372/57 |
| 5,023,884 A | | 6/1991 | Akins et al. |
| 5,175,063 A | * | 12/1992 | Ishihara et al. ............... 429/32 |
| 5,727,011 A | | 3/1998 | Choo et al. |
| 5,770,933 A | | 6/1998 | Larson et al. |
| 5,848,089 A | * | 12/1998 | Sarkar et al. ................. 372/58 |
| 6,337,872 B1 | * | 1/2002 | Nara et al. ................... 372/58 |
| 6,404,794 B1 | * | 6/2002 | Sekiguich et al. ............ 372/57 |

FOREIGN PATENT DOCUMENTS

| | | |
|---|---|---|
| JP | 1-189974 | 7/1989 |
| JP | 4-103182 | 4/1992 |
| JP | 6-21543 | 1/1994 |
| JP | 6-334240 | 12/1994 |
| JP | 9-228986 | 9/1997 |
| JP | 9-246672 | 9/1997 |
| JP | 10-163546 | 6/1998 |
| JP | 10-173259 | 6/1998 |
| WO | WO 99/42731 | 8/1999 |

* cited by examiner

*Primary Examiner*—Paul Ip
*Assistant Examiner*—James Menefee
(74) *Attorney, Agent, or Firm*—Armstrong, Westerman & Hattori, LLP

(57) ABSTRACT

The present invention provides a discharge-pumped excimer laser device which includes a laser chamber filled with a laser gas that is deteriorated to a small extent, magnetic bearings and a motor that are resistant to the entry of dust particles, and parts that are held in contact with the laser gas and suffer little damage, and has a long service life.

The discharge-pumped excimer laser device according to the present invention has a laser chamber (1) filled with a lasergas and housing at least a pair of main discharge electrodes (2, 2) for producing an electric discharge to be able to oscillate a laser beam, housings (6, 7) joined to opposite sides of the laser chamber (1), a cross flow fan (3) having opposite ends rotatably supported by magnetic bearings (8, 9, 10, 11) accommodated in the housings (6, 7), for producing a high-speed laser gas flow between the main discharge electrodes (2, 2), a motor (12) accommodated in the housing (7) for rotating the cross flow fan (3), laser gas flow passages (61, 62) extending through gaps between rotor side and stator side of the magnetic bearings (8, 9, 10, 11) and the motor (12) over an axial entire length of the housings (6, 7), and communicating with an interior of the laser chamber (1), a laser gas introduction passage (60) extending from the interior of the laser chamber (1) and communicating with the laser gas flow passages (61, 62), and filters (20, 20) disposed in the laser gas introduction passage (60).

10 Claims, 9 Drawing Sheets

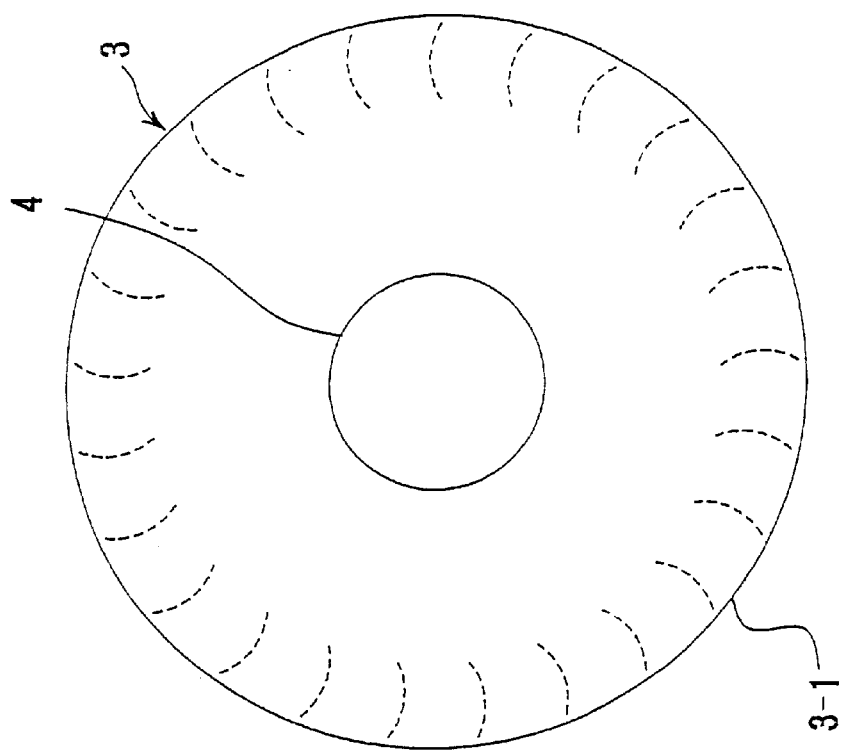
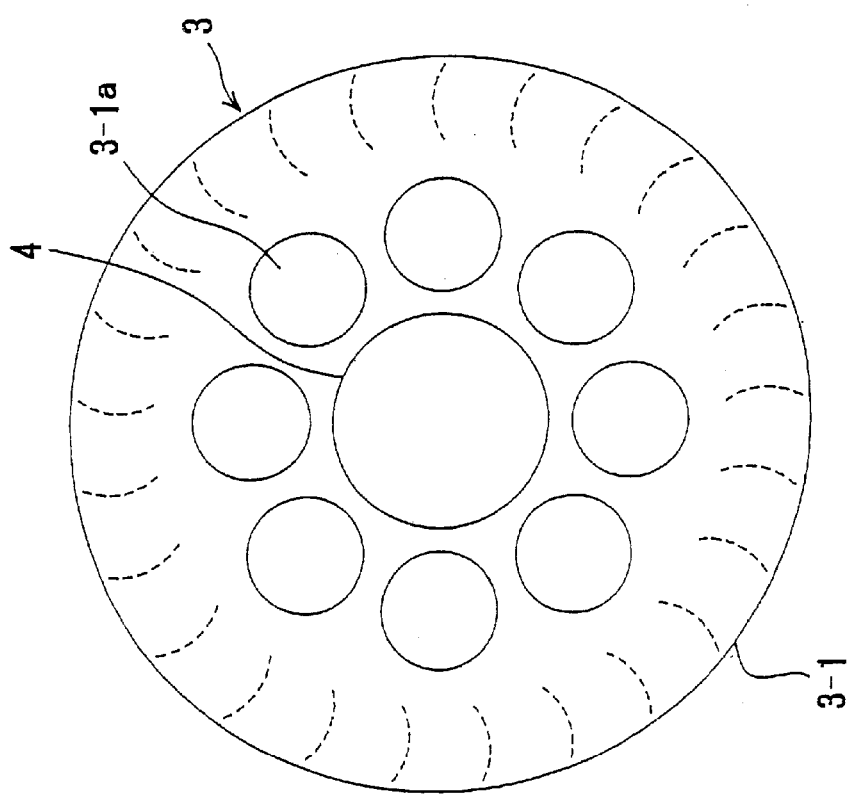

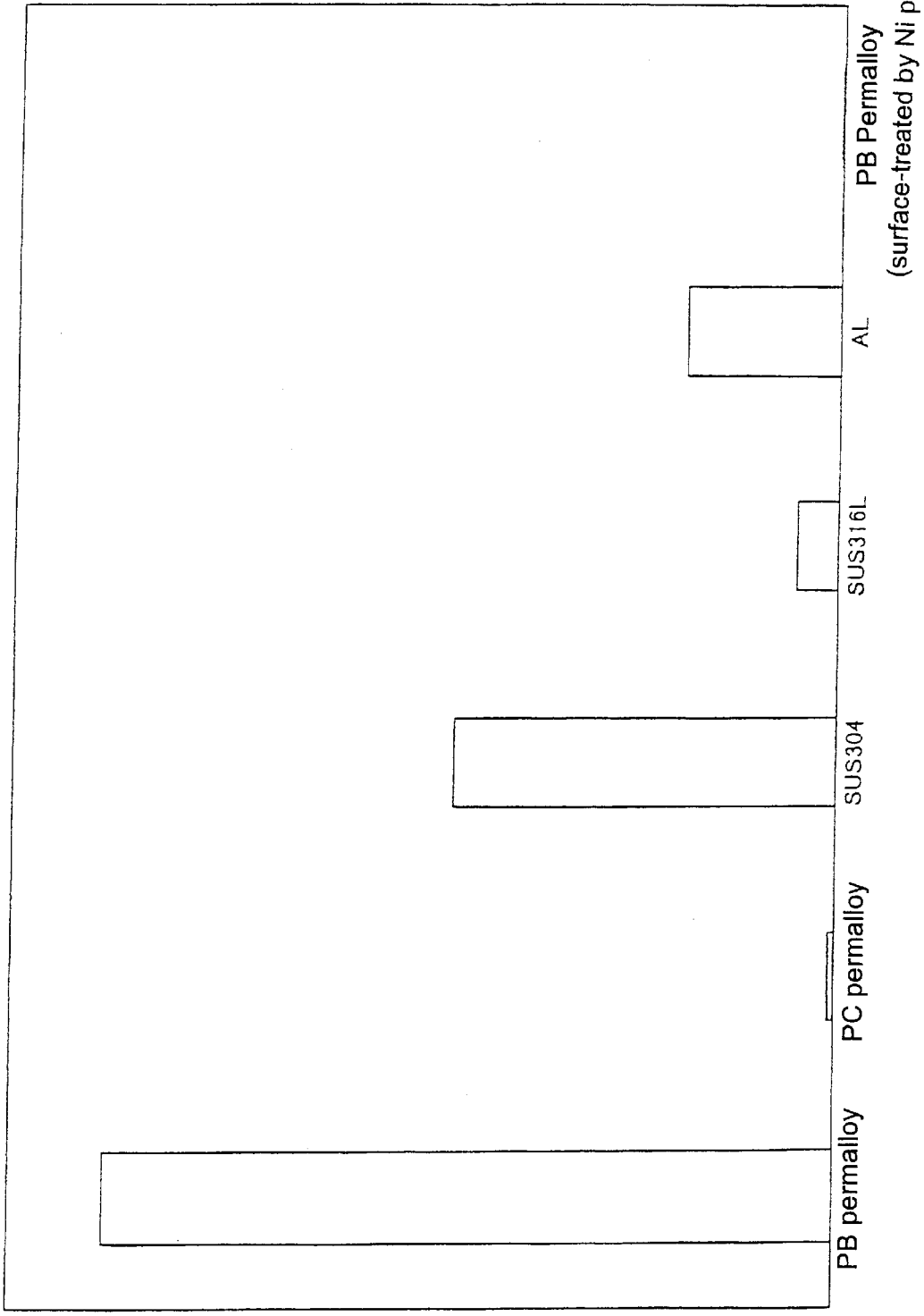

DISCHARGE-PUMPED EXCIMER LASER DEVICE

TECHNICAL FIELD

The present invention relates to a discharge-pumped excimer laser device, and more particularly to a discharge-pumped excimer laser device having a cross flow fan rotatably supported by magnetic bearings, for generating a high-speed gas flow between a pair of main discharge electrodes.

BACKGROUND ART

FIG. 9 is a cross-sectional view showing a general structure of a conventional discharge-pumped excimer laser device of the type described above. As shown in FIG. 9, the conventional discharge-pumped excimer laser device has preionizing electrodes (not shown) for preionizing a laser gas and a pair of main discharge electrodes 102, 102 for producing an electric discharge to be able to oscillate a laser beam, the preionizing electrodes and the main discharge electrodes 102, 102 being disposed in a laser chamber 101 filled with a laser gas. The laser chamber 101 also houses therein a cross flow fan 103 for generating a high-speed gas flow between the main discharge electrodes 102, 102.

The cross flow fan 103 has a rotatable shaft 104 extending from opposite ends thereof and rotatably supported by bearings 106, 106 that are mounted in opposite sides of the laser chamber 101. The laser chamber 101 has windows 105, 1051 for emitting the laser beam from the laser chamber 101 therethrough and a dust filter (not shown) for removing dust from the laser gas in the laser chamber 101.

The bearings 106, 106 by which the cross flow fan 103 is rotatably supported are lubricated by a lubricant that usually comprises a fluorine-based grease. It is known that the fluorine-based grease is least degraded by a corrosive gas such as a fluorine-based gas used in the discharge-pumped excimer laser device. However, the fluorine-based grease is problematic that it tends to be diffused in the laser gas and causes a photochemical reaction with light generated by the electric discharge and fluorine contained in the laser gas, producing impurities such as $CF_4$, etc. which are liable to degrade the laser gas.

There has been proposed a discharge-pumped excimer laser device in which components of the bearings are coated with a solid lubricating film to dispense with any grease. However, it has been pointed out that the solid lubricant causes more friction in the bearings than the grease lubricant. In addition, since the solid lubricating film has a thickness of up to 1 $\mu$m, it is likely to be peeled off when submicroscopic metal dust particles produced by the electric discharge in the laser chamber find their way into the bearings.

There has also been proposed a process of positively introducing a laser gas from which dust particles have been removed into regions between the cross flow fan and the bearings with a view to protecting the bearings. It has also been proposed to make bearing holders of PTFE (polytetrafluoroethylene) that has an excellent lubricating capability. Since, however, the fluorine-based material is used, scraped dust particles tend to be diffused into the laser chamber.

Because the discharge-pumped excimer laser device uses a halogen gas which is highly reactive with the laser gas, the laser chamber houses therein components which are made of Ni and Ni-plated metal materials that are highly resistant to halogen-induced corrosion. However, upon laser oscillation, since the laser gas is excited by the electric discharge between the discharge electrodes, the Ni and Ni-plated metal materials in the laser chamber are sputtered, thus producing an Ni powder and an Ni powder that has chemically reacted with the halogen gas in the laser gas.

Inasmuch as the Ni powder is ferromagnetic, if the contactless magnetic bearings are used as the bearings and a motor is incorporated, then the Ni powder is attached to and deposited on the magnetic material surfaces of the magnetic bearings and the motor, tending to obstruct the rotation of the cross flow fan. It has heretofore been customary to increase the clearance between the rotor and the stator as much as possible to prevent the rotation of the cross flow fan from being obstructed even when dust particles are attached to the magnetic material surfaces of the magnetic bearings and the motor.

However, as the allowance for dust particles to be attached to the magnetic bearings and the motor increases, the clearance between the rotor and the stator needs to be increased, resulting in a reduction in the force for controlling the magnetic bearings. Generally, because the force for controlling the magnetic bearings are reduced in proportion to the square of the clearance, if the clearance is doubled and the force for controlling the magnetic bearings is to be maintained, then it is necessary to use magnetic bearings in which the surface area of the electromagnet is increased four times, or the number of turns of the electromagnet is increased four times, or the coil control current is increased twice.

DISCLOSURE OF THE INVENTION

The present invention has been made in view of the above drawbacks. It is a first object of the present invention to provide a discharge-pumped excimer laser device which includes a laser chamber filled with a laser gas that is deteriorated to a small extent, magnetic bearings and a motor that are resistant to the entry of dust particles, and parts that are held in contact with the laser gas and suffer little damage, and has a long service life.

A second object of the present invention is to provide a discharge-pumped excimer laser device which prevents dust particles from entering magnetic bearings and a motor and can be continuously operated over a long period of time.

To achieve the above objects, there is provided in accordance with an invention described in claim 1, a discharge-pumped excimer laser device, comprising: a laser chamber filled with a laser gas and housing at least a pair of main discharge electrodes for producing an electric discharge to oscillate a laser beam; a cross flow fan having opposite ends rotatably supported by magnetic bearings, for producing a high-speed laser gas flow between the main discharge electrodes; a motor for rotating the cross flow fan; laser gas flow passages extending through gaps between rotor side and stator side of the magnetic bearings and the motor and communicating with an interior of the laser chamber; a laser gas introduction passage extending from the interior of the laser chamber and communicating with the laser gas flow passages; and filters disposed in the laser gas introduction passage.

With the above invention, the laser gas in the laser chamber flows from the laser gas introduction passage through the laser gas flow passages back into the laser chamber. When the laser gas flows through the laser gas flow passages, the laser gas flows through the gap between the stator side and rotor side of the magnetic bearings by which the cross flow fan is rotatably supported and the gap between the stator side and rotor side of the motor which rotates the cross flow fan, thus replacing the gas in these gaps. Therefore, the working time required to remove impurities from the discharge-pumped excimer laser device when it starts to operate is shortened, and the discharge-pumped excimer laser device is kept dust-free.

According to an invention described in claim 2, the discharge-pumped excimer laser device according to claim 1, wherein the magnetic bearings and the motor are accommodated in housings joined to opposite sides of the laser chamber.

With the above invention, the laser chamber and the housings are separate from each other, and can be serviced for maintenance and assembled with ease.

According to an invention described in claim 3, the discharge-pumped excimer laser device according to claim 2, wherein the laser gas flow passages extend over an entire length of the housings and communicate with the laser gas introduction passage at respective ends of the housings.

With the above invention, the laser gas is caused to flow in one direction in the laser gas flow passages over their entire length, and is prevented from being trapped in the laser gas flow passages.

According to an invention described in claim 4, the discharge-pumped excimer laser device according to claim 1, 2, or 3, wherein portions of the magnetic bearings and the motor which face the laser gas flow passages are made of a material which is resistant to corrosion by the laser gas or covered with a can made of a material which is resistant to corrosion by the laser gas.

With the above invention, since the portions of the magnetic bearings and the motor which face the laser gas flow passages are made of a material which is resistant to corrosion by the laser gas or covered with a can made of a material which is resistant to corrosion by the laser gas, the corrosion resistance of the magnetic bearings and the motor is increased.

According to an invention described in claim 5, the discharge-pumped excimer laser device according to claim 4, wherein the material which is resistant to corrosion by the laser gas is permalloy, austenitic stainless steel, nickel-copper alloy, nickel-chromium alloy, or nickel-chromium-molybdenum alloy.

With the above invention, the stator side and rotor side of the motor and the stator side of the magnetic bearings are covered with a can of austenitic stainless steel or the like, and the rotor side of the magnetic bearings are made of a pure PC permalloy, so that the magnetic bearings and the motor can have their service life extended can have their performance and efficiency increased, and can be reduced in size.

According to an invention described in claim 6, the discharge-pumped excimer laser device according to claim 1, 2, 3, 4, or 5, wherein a differential pressure generating mechanism is disposed in the laser gas introduction passage.

With the above invention, since the differential pressure generating mechanism is disposed in the laser gas introduction passage, the laser gas is caused to flow reliably from the laser gas introduction passage through the laser gas flow passages back into the laser chamber. As a result, dust particles are prevented from flowing into the magnetic bearings and the motor.

According to an invention described in claim 7, the discharge-pumped excimer laser device according to claim 1, 2, 3, 4, or 5, wherein a differential pressure generating mechanism is disposed in the laser gas flow passages.

With the above invention, since the differential pressure generating mechanism is disposed in the laser gas flow passages, the laser gas is caused to flow reliably from the laser gas introduction passage through the laser gas flow passages back into the laser chamber, and dust particles are prevented from flowing into the housings joined to the opposite sides of the laser chamber. As a result, dust particles are prevented from flowing into the magnetic bearings and the motor.

BRIEF DESCRIPTION OF THE DRAWINGS

FIGS. 4A and 4B are views showing the shapes of side plates of a cross flow fan of the discharge-pumped excimer laser device illustrated in FIG. 1;

FIG. 5 is a diagram showing the results of a corrosion resistance test conducted on the fluorine of permalloys;

BEST MODE FOR CARRYING OUT THE INVENTION

Embodiments of the present invention will be described below with reference to FIGS. 1 through 8.

Figure 1:
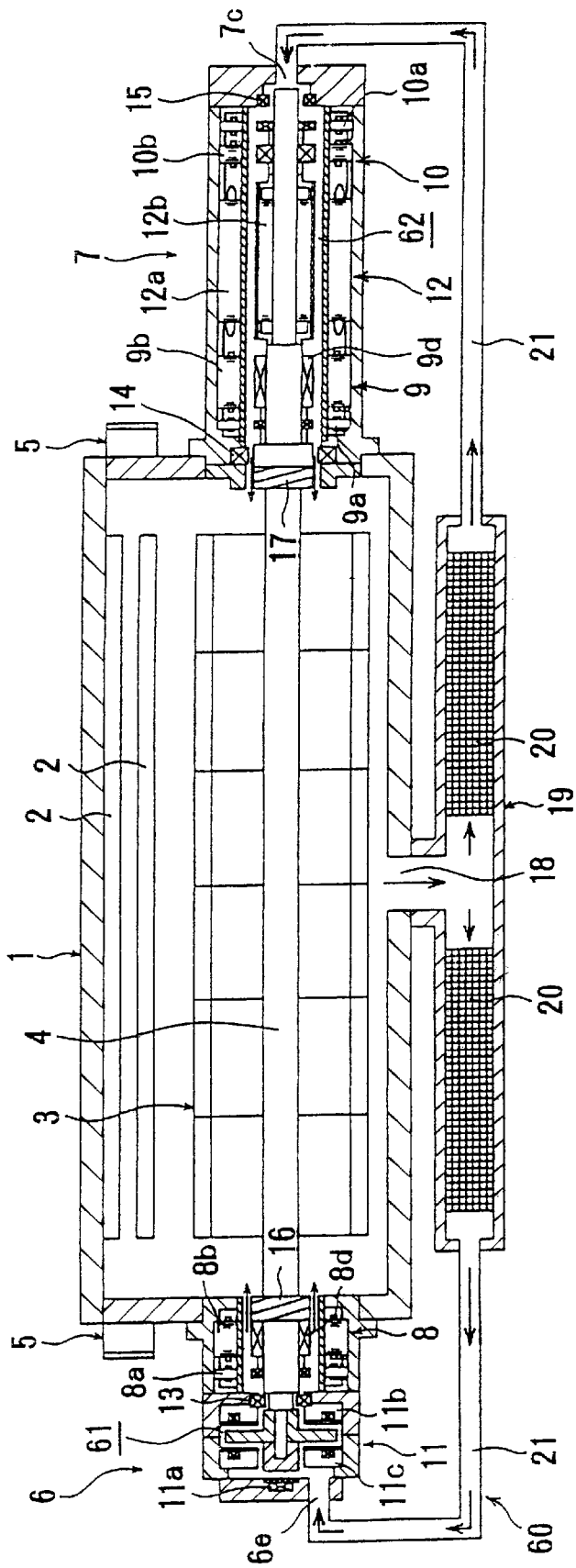
FIG. 1 is a cross-sectional view showing an overall structure of a discharge-pumped excimer laser device according to a first embodiment of the present invention.
Figure 2:
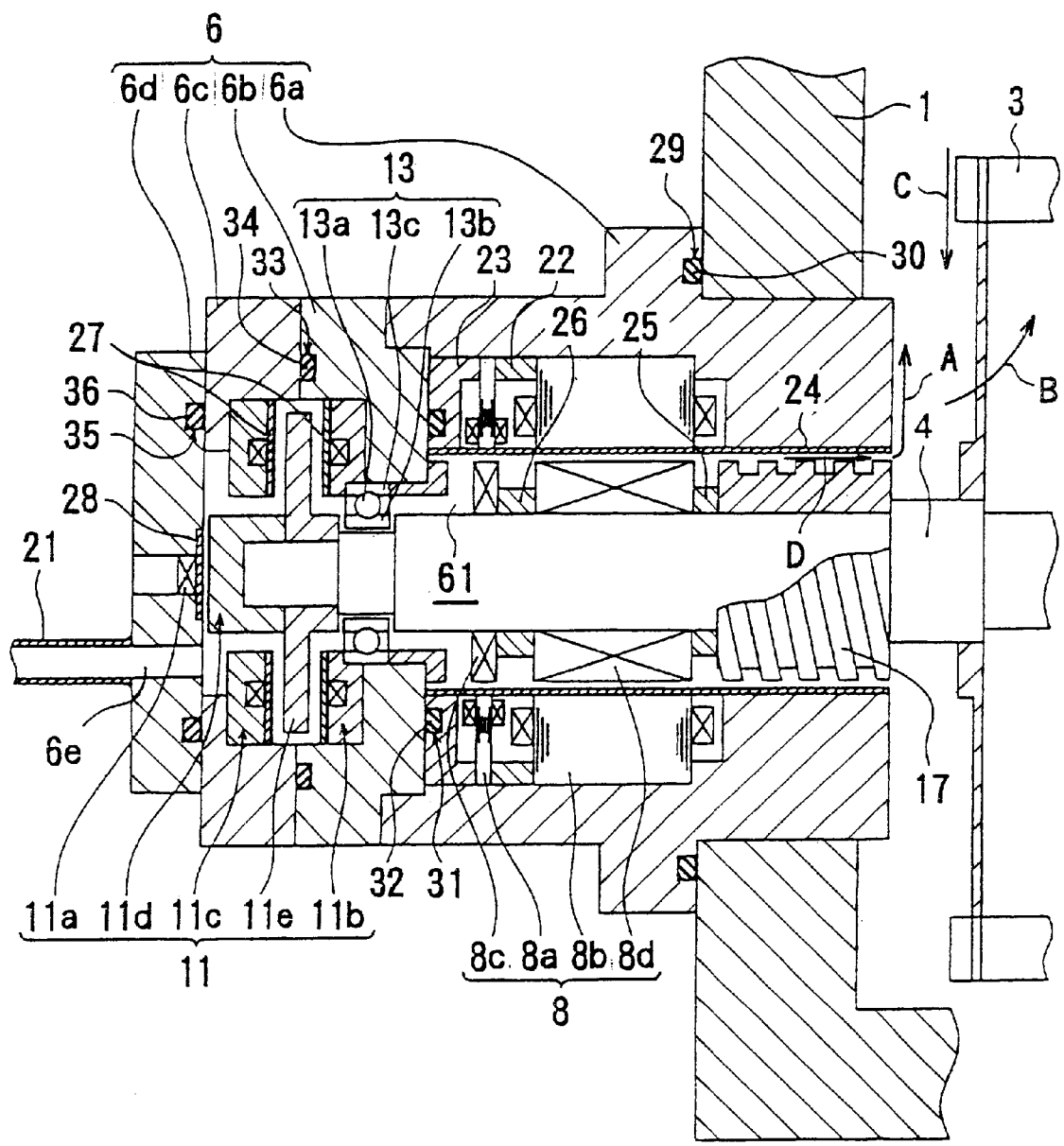
FIG. 2 is a cross-sectional view showing details of a bearing housing of the discharge-pumped excimer laser device illustrated in FIG. 1.
Figure 3:
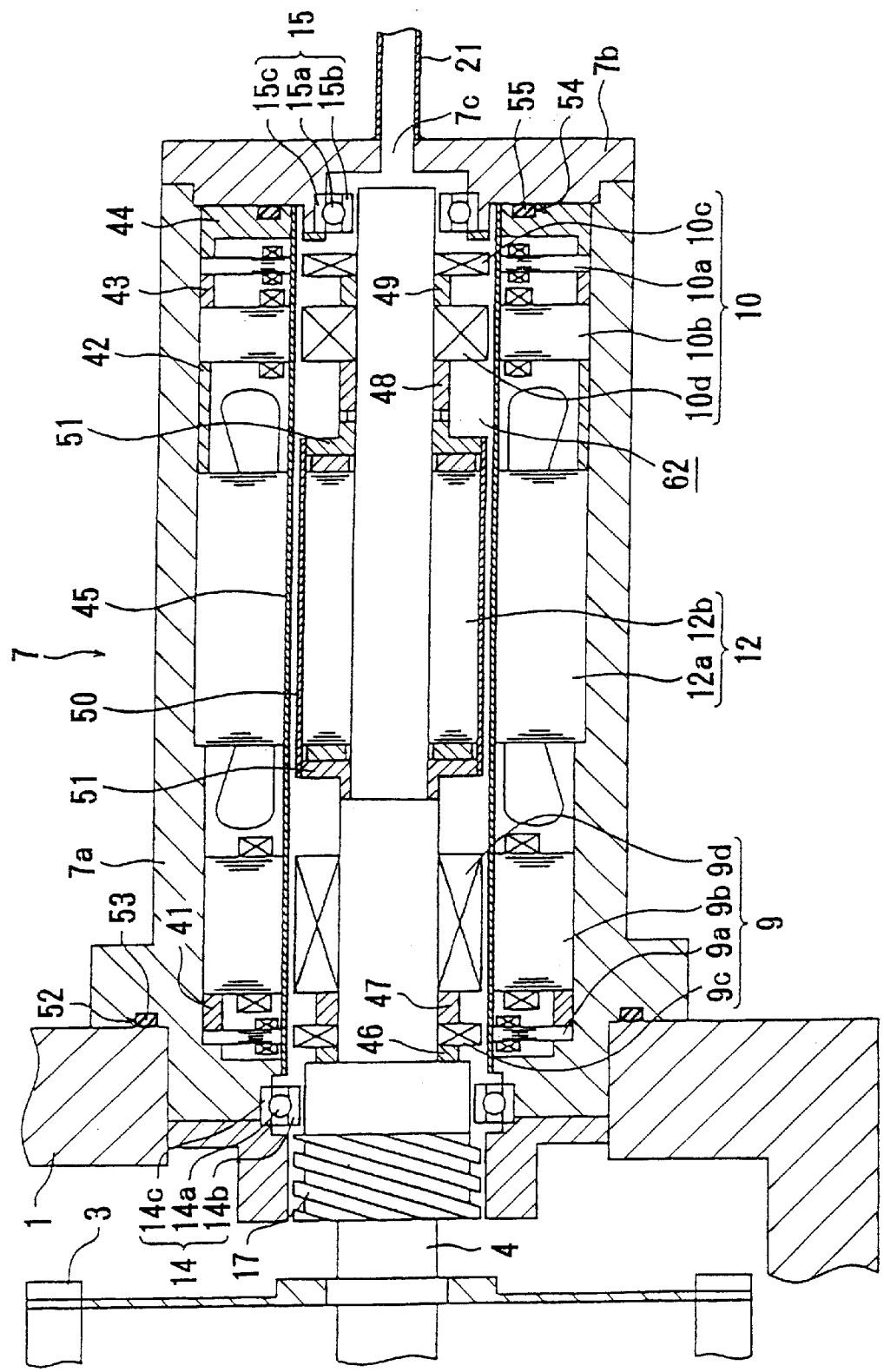
FIG. 3 is a cross-sectional view showing details of a motor housing of the discharge-pumped excimer laser device illustrated in FIG. 1.

FIGS. 1 through 4 show a discharge-pumped excimer laser device according to a first embodiment of the present invention. FIG. 1 is a cross sectional view showing an overall structure thereof, FIG. 2 is a cross-sectional view showing details of a bearing housing thereof, FIG. 3 is a cross-sectional view showing details of a motor housing thereof, and FIGS. 4A and 4B are views showing the shapes of side plates of a cross flow fan thereof.

As shown in FIG. 1, a laser chamber 1 houses therein preionizing electrodes (not shown) for preionizing a laser gas and a pair of main discharge electrodes 2, 2 for producing an electric discharge to be able to oscillate a laser beam. The laser chamber 1 also houses therein a cross flow fan 3 for generating a high-speed gas flow between the main discharge electrodes 102, 102. The main discharge electrodes may be provided in a plurality of pairs.

The laser beam is oscillated by a laser-pumping electric discharge produced when a high voltage is applied between the main discharge electrodes 2, 2. The generated laser beam is emitted out of the laser chamber 1 through windows 5, 5 disposed on side walls of the laser chamber 1. When the laser-pumping electric discharge is caused, the laser gas present between the main discharge electrodes 2, 2 is deteriorated and has its discharge characteristics lowered, failing to perform repetitive oscillation. To solve this problem, the cross flow fan 3 is rotated to circulate the laser gas in the laser chamber 1 to replaced the laser gas between the main discharge electrodes 2, 2 in each electric discharge cycle, to that the laser gas can stably be oscillated repetitively.

The distance between the main discharge electrodes 2, 2 is about 20 mm, and the entire length thereof is about 600 mm. The frequency of the repetitive oscillation of the laser gas is several thousand times a second. The entire length of the cross flow fan 3 is slightly larger than the length of the main discharge electrodes 2, 2 in order to achieve a uniform flow rate over the entire length of the main discharge electrodes 2, 2. The cross flow fan 3 is rotated at a speed ranging from 2500 to 3500 $min^{-1}$ to obtain a sufficient gas flow that is required between the main discharge electrodes 2, 2. In the present embodiment, since a rotor is supported by magnetic bearings in a contactless manner, the upper limit for rotational speeds allowed by the bearing capability is several tens of thousands rpm. Therefore, the cross flow fan may comprise a high-speed cross flow fan.

The cross flow fan 3 has a rotatable shaft 4 extending therethrough and extending from opposite ends thereof. The rotational shaft 4 is rotatably supported in a contactless manner by radial magnetic bearings 8, 9, 10 and an axial magnetic bearing 11 that are accommodated in a bearing housing 6 and a motor housing 7 which are disposed on opposite sides of the laser chamber 1. The motor housing 7 houses therein a motor 12 for imparting rotational power to the rotatable shaft 4 of the cross flow fan 3.

The bearing housing 6 and the motor housing 7 also house therein protective bearings 13, 14, 15 which support the rotatable shaft 4 of the cross flow fan 3 when the radial magnetic bearings 8, 9, 10 are not in operation.

The bearing housing 6 and the motor housing 7 also house therein, near the laser chamber 1, screw groove labyrinth 16, 17 as differential pressure generating mechanisms which rotate in unison with the rotatable shaft 4 for generating a differential pressure. In this embodiment, the screw-type rotating labyrinth seal 16 has its screw grooves located on the rotatable shaft 4 of the cross flow fan 3. However, the screw grooves may be located in the bearing housing 6 and the motor housing 7.

The laser chamber 1 has a gas outlet port 18 which is connected to a gas introduction port 6e defined in an end of the bearing housing 6 and a gas introduction port 7c defined gin an end of the motor housing 7 by a laser gas introduction chamber 19 and gas inlet pipes 21, 21, thus making up a gas introduction passage 60. The laser gas introduction chamber 19 houses therein dust removing filters 20, 20.

The bearing housing 6 has a laser gas flow passage 61 defined therein which extends through gaps between the rotors and stators of the radial magnetic bearing 8 and the axial magnetic bearing 11, over the entire axial length of the bearing housing 6, and communicates with the interior of the laser chamber 1. The motor housing 7 has a laser gas flow passage 62 defined therein which extends through gaps between the rotors and stators of the radial magnetic bearings 9, 10 and the motor 12, over the entire axial length of the motor housing 7, and communicates with the interior of the laser chamber 1. The laser gas flow passages 61, 62 communicate with the laser gas introduction passage 60 through the gas introduction ports 6e, 7c.

When the rotatable shaft 4 rotates to rotate the cross flow fan 3 and the screw groove labyrinths 16, 17, the laser gas in the laser chamber 1 flows from the laser gas introduction passage 60 through the laser gas flow passages 61, 62 back into the laser chamber 1. As the laser gas flows along the laser gas flow passages 61, 62, the laser gas flows through the gaps between the rotors and stators of the magnetic bearings 8, 9, 10, 11 by which the cross flow fan 3 is rotatably supported, and also through the gap between the stator and rotor of the motor 12 which rotates the cross flow fan 3.

As shown in detail in FIG. 2, the bearing housing 6 comprises a main bearing housing body 6a mounted on the side wall of the laser chamber 1, a pair of electromagnet housings 6b, 6c, and a bearing cover 6d having the gas introduction port 6e defined therein. The radial magnetic bearing 8 and the axial magnetic bearing 11 are accommodated in the bearing housing 6. Sealing grooves 29, 31, 33, 35 are defined in mating surfaces of these components of the bearing housing 6, and sealing members 30, 32, 34, 36 are mounted respectively in the sealing grooves 29, 31, 33, 35 to seal the laser gas. The sealing members 30, 32, 34, 36 should preferably be made of metal such as stainless steel or aluminum, for example, which emits a small amount of gas such as moisture that contaminates the laser gas.

The radial magnetic bearing 8 has a displacement sensor 8a and an electromagnet 8b that are relatively positioned by a spacer 22 and a side plate 23, and housed in the main bearing housing body 6a. A thin cylindrical can 24 is inserted in the main bearing housing body 6a against its inner circumferential surface, and has its opposite ends fixed as by welding to the main bearing housing body 6a. With this construction, the displacement sensor 8a and the electromagnet 8b which are constructed of silicon steel sheets and copper wire coils that are not highly resistant to corrosion by the laser gas are held out of contact with the laser gas. The inner circumferential surfaces of the displacement sensor 8a and the electromagnet 8b may be provided with an isolation phase or partition wall of plated Ni or PTFE (polytetrafluoroethylene).

The axial magnetic bearing 11 has electromagnets 11b, 11c fixed in position by the electromagnet housings 6b, 6c in facing relation to each other. Thin disk-shaped cans 27, 27 are fixed as by welding to surfaces of the electromagnets 11b, 11c. The axial displacement sensor 11a is housed in the bearing cover 6d, and a thin disk-shaped can 28 is fixed as by welding to a surface of the axial displacement sensor 11a which is held in contact with the laser gas, thus placing the axial displacement sensor 11a out of the sealed chamber.

The cans 24, 27, 28 are made of austenitic stainless steel, nickel-copper alloy, nickel-chromium alloy, or Hastelloy (nickel-chromium-molybdenum alloy) which is highly resistant to corrosion by the laser gas. Thus, the cans 24, 27, 28 are prevented from being corroded by the laser gas Since the cans 24, 27, 28 communicated with the laser gas chamber 1 are making up a sealing space, they need to have a thickness large enough to withstand the sealed pressure (1–3 $kg/cm^2$) of the laser gas. Since the above materials are of high mechanical strength, the thickness of the cans can be reduced. In addition, since the above materials are nonmagnetic materials which do not obstruct lines of magnetic forces produced by the magnetic bearings, the magnetic bearings can efficiently be operated.

A displacement sensor target 8c and an electromagnet target 8d of the radial magnetic bearing 8 are relatively positioned by rotor spacers 25, 26 and fixed to the rotatable shaft 4 of the cross flow fan 3. A displacement sensor target lid and an electromagnet target lie of the axial magnetic bearing 11 are fixed to an end of the rotatable shaft 4, and placed in the sealed space that communicates with the laser chamber 1.

The displacement sensor target 8c and the electromagnet target 8d of the radial magnetic bearing 8, and the displacement sensor target lid and the electromagnet target 11e of the axial magnetic bearing 11 are made of a magnetic material which comprises a pure PC permalloy (Fe—Ni alloy containing 75–80% of Ni) that is highly resistant to corrosion by fluorine contained in the laser gas.

The PC permalloy may be replaced with PD permalloy (Fe—Ni alloy containing 35–40% of Ni) or PB permalloy (Fe—Ni alloy containing 45–50% of Ni) that has a large saturated flux density and is suitable for use as an electromagnet material, with the PD permalloy or PB permalloy being plated with Ni on its surface. The PD permalloy or PB permalloy thus plated with Ni is as resistant to corrosion by the laser gas as PC permalloy or more resistant to corrosion by the laser gas than PC permalloy. The permalloy needs to be plated with a uniform and highly adhesive layer of Ni in order to prevent a gas trap for contaminating the laser gas from being formed.

FIG. 5 is a diagram showing the results of a corrosion resistance test conducted on the fluorine gas of permalloys. As shown in FIG. 5, PC permalloy (JISC2531) containing 80% of Ni is more corrosion-resistant than austenitic stainless steel SUS316L. The resistance to corrosion by a fluorine gas of PB permalloy (JISC2531) containing 45% of Ni is about one-half of austenitic stainless steel SUS304, and hence PB permalloy (JISC2531) is less corrosion-resistant than PC permalloy. However, it can be seen that PB permalloy that is surface-treated by Ni plating, for example, is as corrosion-resistant as PC permalloy or more corrosion-resistant than PC permalloy.

The protective bearing 13 comprises a rolling bearing having balls 13a made of alumina ceramics, and inner race 13b and outer race 13c which are made of stainless steel such as SUS440C. Since the protective bearing 13 is disposed in the sealed space communicating with the laser chamber 111, the balls 13, the inner race 13b and the outer race 13c are made of a material that is resistant to corrosion by the laser gas. Therefore, the protective bearing 13 in the present embodiment is not deteriorated by the laser gas. Since the balls 13a are made of alumina ceramics, the allowable rotational speed and allowable load of the protective bearing 13 are increased, making itself suitable for use as the protective bearing 13. While the protective bearing 13 is made of the above materials in the present embodiment, the balls 13a may be made of zirconia ceramics. The inner race 13b and the outer race 13c may be made of alumina ceramics or zirconia ceramics.

The inner and outer races have rolling surfaces coated with a solid lubricant of polytetrafluoroethylene (PTFE). Since PTFE that is stable against the laser gas and has a high lubricating capability is used as a solid lubricant in the protective bearing 13, it does not deteriorate the laser gas. The solid lubricant is capable of making the service life of the bearing much longer than if no lubricant were used. Therefore, the protective bearing 13 does not need to be replaced over a long period of time. Alternatively, a solid lubricant made of lead or an alloy of lead may be used as a lubricant.

The protective bearing 13 may comprise a ring made of PTFE. Since PTFE is a highly pure fluorine resin, it is highly resistant to weathering and may be a structure of few gas traps.

As shown in detail in FIG. 3, the motor housing 7 comprises a main motor housing body 7a mounted on the side wall of the laser chamber 1 and a bearing cover 7b having the gas introduction port 7c defined therein. The radial magnetic bearings 9, 10 and the motor 12 are accommodated in the motor housing 7. Sealing grooves 52, 54 are defined in mating surfaces of these components of the motor housing 7, and sealing members 53, 55 are mounted respectively in the sealing grooves 52, 54 to seal the laser gas. The sealing members 53, 55 should preferably be made of metal such as stainless steel or aluminum, for example, which emits a small amount of gas such as moisture that contaminates the laser gas.

A displacement sensor 9a and an electromagnet 9b of the radial magnetic bearing 9, a stator 12a of the motor 12, and a displacement sensor 10a and an electromagnet 10b of the radial magnetic bearing 10 are relatively positioned by spacers 41, 42, 43 and a side plate 44, and accommodated in the main motor housing body 7a. A thin cylindrical can 45 is inserted in the main motor housing body 7a against its inner circumferential surface, and has its opposite ends fixed as by welding to the main motor housing body 7a. The can 45 is made of austenitic stainless steel, Hastelloy (nickel-chromium-molybdenum alloy), or the like for the reasons described above. With this construction, the displacement sensor 9a and the electromagnet 9b of the radial bearing 9, the displacement sensor 10a and the electromagnet 10b of the radial magnetic bearing 10, and the stator 12a of the motor 12 are prevented from contacting the laser gas.

A displacement sensor target 9c and an electromagnet target 9d of the radial magnetic bearing 9, a rotor 12b of the motor 12, and a displacement sensor target 10c and an electromagnet target 10d of the radial magnetic bearing 10 are relatively positioned by rotor spacers 46, 47, 48, 49 and fixed to the rotatable shaft 4 of the cross flow fan 4, and are placed in the sealed space that communicates with the laser chamber 1. As with the displacement sensor target 8c and the electromagnet target 8d of the radial magnetic bearing 8, the displacement sensor targets 9c, 10c and the electromagnet targets 9d, 10d are made of PC permalloy (Fe—Ni alloy containing 70–80% of Ni). However, the displacement sensor targets 9c, 10c and the electromagnet targets 9d, 10d may be made of PD permalloy (Fe—Ni alloy containing 35–40% of Ni) or PB permalloy (Fe—Ni alloy containing 40–50% of Ni) plated with Ni on its surface.

A can 50 is attached to the outer circumferential surface of the rotor 12b of the motor 12 and fixed as by welding to side plates 51, 51, and the side plates 51, 51 and the rotatable shaft 4 of the cross flow fan 3 are fixed as by welding to each other, thus defining a sealed space to keep the rotor 12b out of contact with the laser gas. The can 50 is made of austenitic stainless steel, Hastelloy (nickel-chromium-molybdenum alloy), or the like for the reasons described above.

As with the protective bearing 13 in the bearing housing 6, the protective bearings 14, 15 comprise rolling bearings having balls 14a, 15b made of alumina ceramics, and inner races 14b, 15b and outer races 14c, 15c made of stainless steel such as SUS440C. Alternatively, the protective bearings 14, 15 may comprise rings made of PTFE.

FIGS. 4A and 4B show the shapes of side plates 3-1 attached to each of the opposite side ends of the cross flow fan 3. FIG. 4A shows an apertured side plate 3-1 having a plurality of holes 3-1a, and FIG. 4B shows a flat side plate 3-1 free of holes. If the side plate 3-1 comprises a flat side plate free of holes 3-1a, then it produces a pumping effect to cause the laser gas to flow radially outwardly along the side plate 3-1 as indicated by the arrow A in FIG. 2.

If the side plate 3-1 comprises an apertured side plate, then the laser gas is caused to flow radially outwardly of the cross flow fan 3 through the holes 3-1a as indicated by the arrow B in FIG. 2 due to the fan effect of the cross flow fan 3. As a result, a laser gas flow directed toward the center as indicated by the arrow C in FIG. 2 is passively produced. In addition, the laser gas is caused to flow toward the cross flow fan 3 as indicated by the arrow D in FIG. 2. The laser gas is also caused to flow similarly in the motor housing 7.

With the discharge-pumped excimer laser device thus constructed, when the cross flow fan 3 and the screw groove labyrinths 16, 17 are rotated, the laser gas flows from the laser gas introduction passage 60 through the laser gas flow passages 61, 62 back into the laser chamber 1. The laser gas is cleaned by the dust removing filters 20 in the laser gas introduction chamber 19.

When the cleaned laser gas flows through the laser gas flow passage 61 in the bearing housing 6, it flows through the gap between the rotor side (the displacement sensor target 11d and the electromagnet target 11e) and the stator side (the axial displacement sensor 11a and the electromagnets 11b, 11c) of the axial magnetic bearing 11, and the gap between the rotor side (the displacement sensor target 8c and the electromagnet target 8d) and the stator side (the displacement sensor 8a and the electromagnet 8b) of the radial magnetic bearing 8, replacing the gas in these gaps with the positively cleaned laser gas.

Since the rotor side (the displacement sensor target 11d and the electromagnet target 11e) of the axial magnetic bearing 11 and the rotor side (the displacement sensor target 8c and the electromagnet target 8d) of the radial magnetic bearing 8 are made of PC permalloy that is highly resistant to corrosion by the laser gas, and the stator side (the axial displacement sensor 11a and the electromagnets 11b, 11c) of the axial magnetic bearing 11 and the stator side (the displacement sensor 8a and the electromagnet 8b) of the radial magnetic bearing 8 are covered with the cans 28, 27, 24 made of austenitic stainless: steel, Hastelloy or the like, the corrosion resistance of the magnetic bearings 8, 11 is increased.

When the cleaned laser gas flows through the laser gas flow passage 62 in the motor housing 7, it flows through the gap between the rotor side (the displacement sensor target 10c and the electromagnet target 10d) and the stator side (the displacement sensor 10a and the electromagnet 10b) of the radial magnetic bearing 10, the gap between the rotor 12b and the stator 12a of the motor 12, and the gap between the rotor side (the displacement sensor target 9c and the electromagnet target 9d) and the stator side (the displacement sensor 9a and the electromagnet 9b) of the radial magnetic bearing 9, replacing the gas in these gaps with the positively cleaned laser gas.

Since the rotor side (the displacement sensor target 10c and the electromagnet target 10d) of the radial magnetic bearing 10 and the rotor side (the displacement sensor target 9c and the electromagnet target 9d) of the radial magnetic bearing 9 are made of PC permalloy that is highly resistant to corrosion by the laser gas, the stator side (the displacement sensor 10a and the electromagnet 10b) of the radial magnetic bearing 10, the stator side (the displacement sensor 9a and the electromagnet 9b) of the radial magnetic bearing 9, and the stator 12a of the motor 12 are covered with the can 45 made of austenitic stainless steel, Hastelloy or the like, and the rotor 12b of the motor 12 is covered with the cap 50 made of austenitic stainless steel, Hastelloy or the like, the corrosion resistance of the magnetic bearings 9, 10 and the motor 12 is increased.

Figure 6:
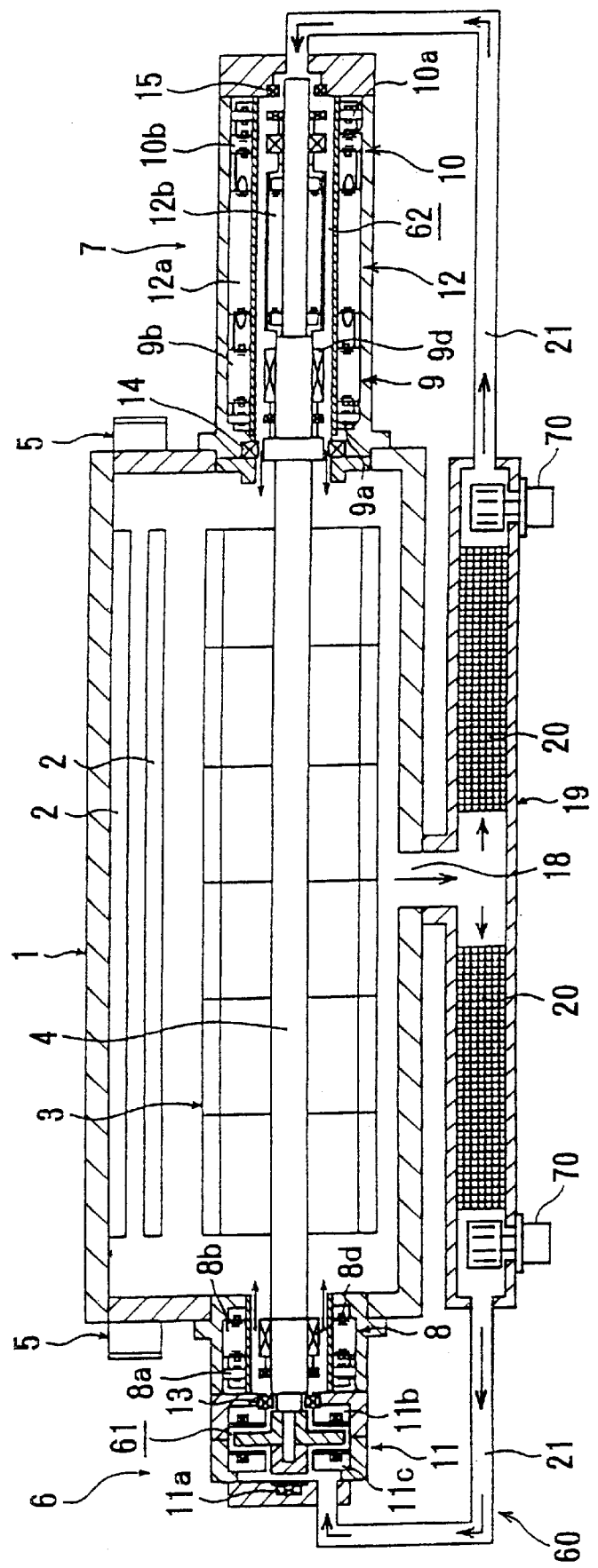
FIG. 6 is a cross-sectional view showing an overall structure of a discharge-pumped excimer laser device according to a second embodiment of the present invention.

FIG. 6 is a cross-sectional view showing a discharge-pumped excimer laser device according to a second embodiment of the present invention. In FIG. 6, identical or corresponding parts are designated by the same reference numerals as those shown in FIGS. 1 through 4. Identical or corresponding parts in other figures are also denoted by identical reference characters. In the discharge-pumped excimer laser device shown in FIG. 6, cross flow fan units 70, 70 are disposed downstream of (in the opposite ends of the gas introduction chamber 19) the dust removing filters 20, 20 in the gas introduction chamber 19.

The cross flow fan units 70, 70 give the laser gas a differential pressure to compensate for a pressure loss caused by the dust removing filters 20, the gas introduction pipe 21, or the magnetic bearings 8, 9, 10, 11 and the motor 12 in the bearing housing 6 and the motor housing 7, allowing the laser gas to flow reliably. With the cross flow fan units 70, 70, the laser gas flow from the laser chamber 1 through the laser gas introduction passage 60 and the laser gas flow passages 61, 62 back into the laser chamber 1 is promoted, and the laser gas flow from the laser chamber 1 through the laser gas flow passages 61, 62 is suppressed, thus preventing dust particles from flowing into the magnetic bearings 8, 9, 10, 11 and the motor 12.

Figure 7:
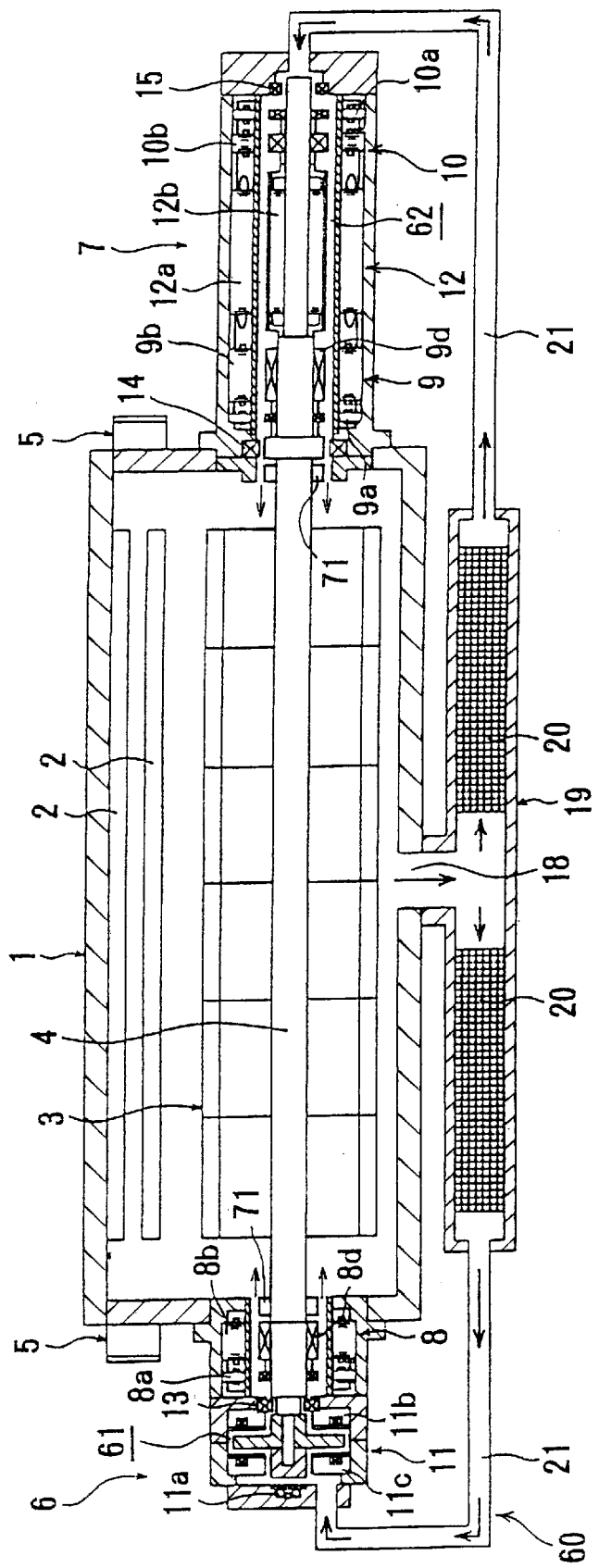
FIG. 7 is a cross-sectional view showing an overall structure of a discharge-pumped excimer laser device according to a third embodiment of the present invention.

FIG. 7 is a cross-sectional view showing a discharge-pumped excimer laser device according to a third embodiment of the present invention. In the discharge-pumped excimer laser device shown in FIG. 7, axial flow fans 71, 71 are disposed in respective flow paths between the laser chamber 1 and the magnetic bearings 8, 9 disposed one on each side of the cross flow fan 3. The axial flow fans 71, 71 are fixed to the rotatable shaft 4 of the cross flow fan 3 and rotatable in unison with the cross flow fan 3 to produce a differential pressure. Since the gas present between the rotor side and stator side of the magnetic bearings 8, 9, 10, 11 and the motor 12 has flowed through the dust removing filters 20 and the gas introduction pipe 21, dust particles are prevented from flowing into the magnetic bearings 8, 9, 10, 11 and the motor 12.

Figure 8:
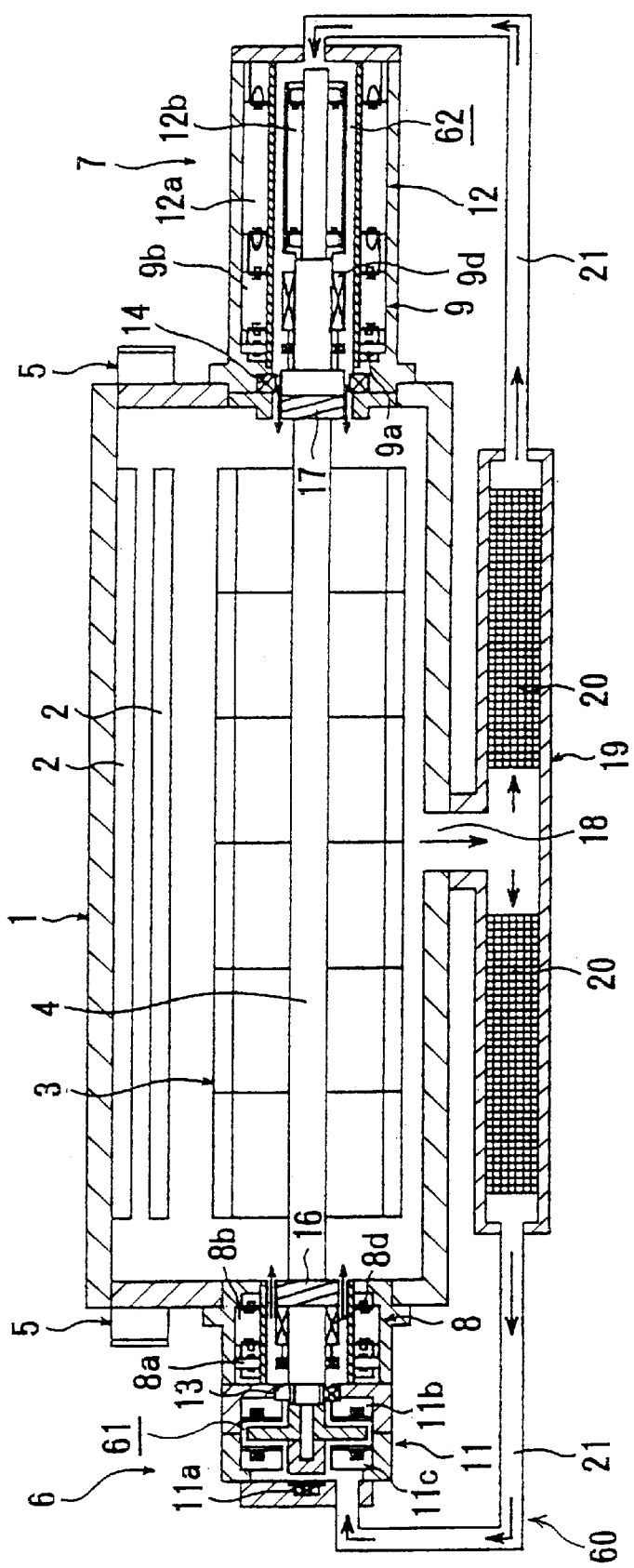
FIG. 8 is a cross-sectional view showing an overall structure of a discharge-pumped excimer laser device according to a fourth embodiment of the present invention.
Figure 9:
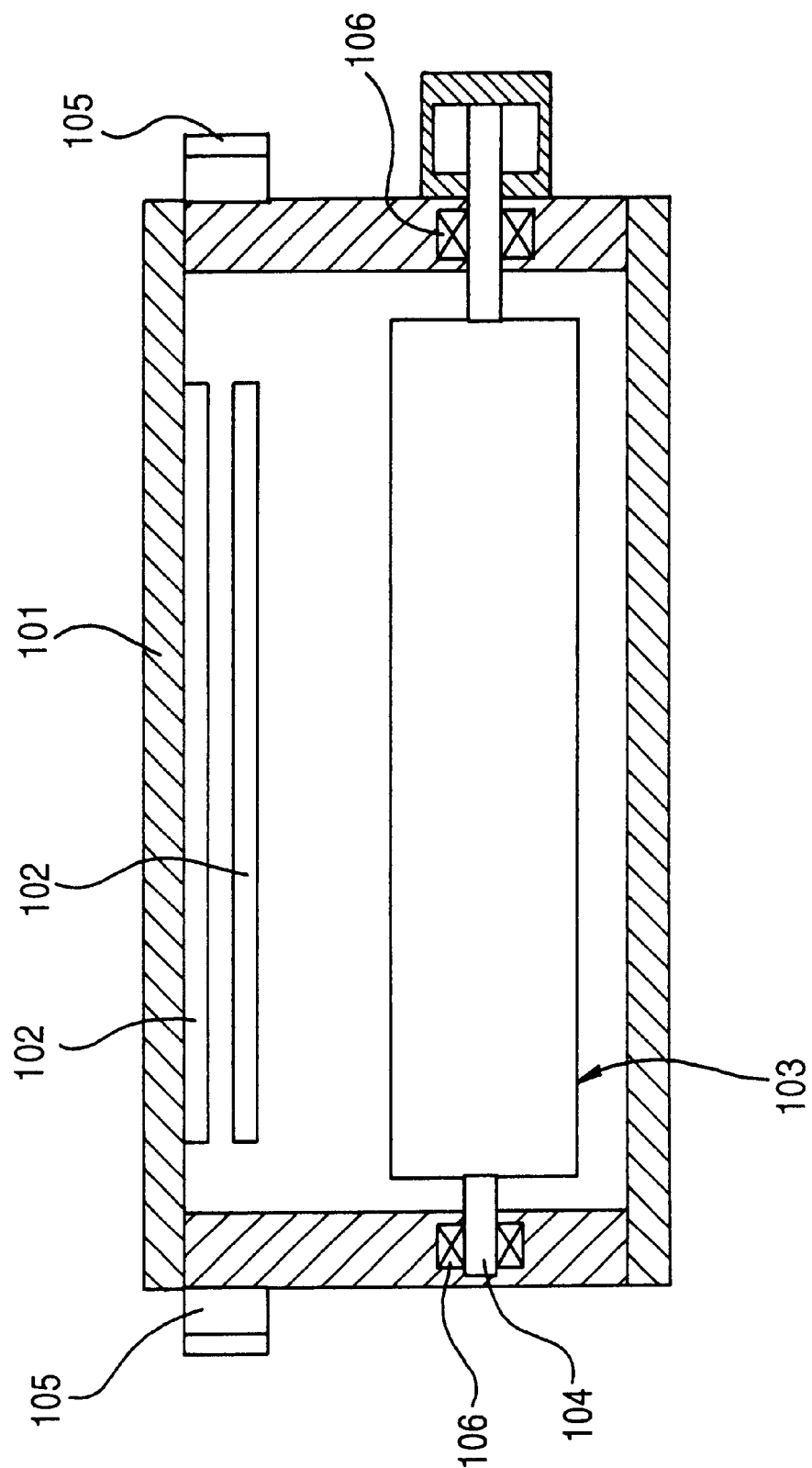
FIG. 9 is a cross-sectional view showing a structure of a conventional discharge-pumped excimer laser device.

FIG. 8 is a cross-sectional view showing a discharge-pumped excimer laser device according to a fourth embodiment of the present invention. The discharge-pumped excimer laser device shown in FIG. 8 differs from the discharge-pumped excimer laser device shown in FIGS. 1 through 4 in that it is free of the radial magnetic bearing 10 on the axial end of the motor 12. The radial magnetic bearing 10 on the axial end of the motor 12 serves to reduce vibrations of the motor 12 and allows the motor 12 to rotate stably if the motor 12 is large in size and tends to produce large vibrations. Therefore, if the motor 12 is small in size and tends to produce small vibrations, then the radial magnetic bearing 10 on the axial end of the motor 12 may be dispensed with as shown in FIG. 8.

According to the present invention, as described above, the laser gas in the laser chamber flows from the laser gas introduction passage through the laser gas flow passages back into the laser chamber. When the laser gas flows through the laser gas flow passages, the laser gas flows through the gap between the stator side and rotor side of the magnetic bearings by which the cross flow fan is rotatably supported and the gap between the stator side and rotor side of the motor which rotates the cross flow fan, thus replacing the gas in these gaps. Therefore, the working time required to remove impurities from the discharge-pumped excimer laser device when it starts to operate is shortened, and the discharge-pumped excimer laser device is kept dust-free. Therefore, the discharge-pumped excimer laser device is clean and has a long service life.

The portions of the magnetic bearings and the motor which face the laser gas flow passages may be made of a material that is highly resistant to corrosion by the laser gas or covered with cans made of a material that is highly resistant to corrosion by the laser gas, thereby making the magnetic bearings and the motor more resistant to corrosion. Thus, the discharge-pumped excimer laser device has a long service life.

The differential pressure generating mechanism may be disposed in the laser gas introduction passage or the laser gas flow passages, allowing the laser gas to flow reliably from the laser gas introduction passage through the laser gas flow passages back into the laser chamber. As a consequence, dust particles are prevented from flowing into and attached to the magnetic bearings and the motor. The fan can thus be continuously operated stably for a long period of time without its rotation being obstructed.

INDUSTRIAL APPLICABILITY

The present invention can be applied as a discharge-pumped excimer laser device having a cross flow fan rotatably supported by magnetic bearings, for generating a high-speed gas flow between a pair of main discharge electrodes.

What is claimed is:

1. A discharge-pumped excimer laser device, comprising:

a laser chamber filled with a laser gas and housing at least a pair of main discharge electrodes for producing an electric discharge to be able to oscillate a laser beam;

a cross flow fan having opposite ends rotatably supported by magnetic bearings, for producing a high-speed laser gas flow between said main discharge electrodes;

a motor for rotating said cross flow fan;

laser gas flow passages extending through gaps between rotor sides and stator sides of said magnetic bearings and communicating with an interior of said laser chamber;

a laser gas introduction passage extending from the interior of said laser chamber and communicating with said laser gas flow passages; and at least one filter disposed in said laser gas introduction passage.

2. A discharge-pumped excimer laser device according to claim 1, wherein said laser gas flow passages extend longitudinally over a total length of said magnetic bearings.

3. A discharge-pumped excimer laser device according to claim 1, wherein said magnetic bearings and said motor are accommodated in housings joined to opposite sides of said laser chamber.

4. A discharge-pumped excimer laser device according to claim 2, wherein said laser gas flow passages extend over an entire length of said housings and communicate with said laser gas introduction passage at respective ends of said housings.

5. A discharge-pumped excimer laser device according to claim 1, 3, or 4, wherein portions of said magnetic bearings and said motor which face said laser gas flow passages are made of a material which is resistant to corrosion by the laser gas or covered with a can made of a material which is resistant to corrosion by the laser gas.

6. A discharge-pumped excimer laser device according to claim 5, wherein said material which is resistant to corrosion by the laser gas is permalloy, austenitic stainless steel, nickel-copper alloy, nickel-chromium alloy, or nickel-chromium-molybdenum alloy.

7. A discharge-pumped excimer laser device according to claim 1, 3 or 4, wherein a differential pressure generating mechanism is disposed in said laser gas introduction passage.

8. A discharge-pumped excimer laser device according to claim 1, 3 or 4, wherein a differential pressure generating mechanism is disposed in said laser gas flow passages.

9. A discharge-pumped excimer laser device according to claim 8, wherein the differential pressure generating mechanism comprises a screw groove labyrinth.

10. A discharge-pumped excimer laser device according to claim 9, wherein the screw groove labyrinth is between the magnetic bearings and the interior of said laser chamber.

* * * * *